United States Patent
VanAssche et al.

(10) Patent No.: US 6,196,621 B1
(45) Date of Patent: Mar. 6, 2001

(54) APPARATUS FOR TRANSFERRING IMPACT ENERGY FROM A TIRE AND WHEEL ASSEMBLY OF A MOTOR VEHICLE TO A SILL

(75) Inventors: Raymond J VanAssche, Utica; Stephen T Green, Troy; Curtis S Hargraves, Clarkston, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/578,527

(22) Filed: May 24, 2000

(51) Int. Cl.$^7$ .................................................. B62D 25/08
(52) U.S. Cl. .................... 296/188; 296/198; 296/203.02; 296/209; 296/30
(58) Field of Search ...................... 296/198, 188, 296/194, 203.02, 203.03, 30, 209, 146.9

(56) References Cited

U.S. PATENT DOCUMENTS

| | | | |
|---|---|---|---|
| 5,042,872 | * | 8/1991 | Yoshii ............................. 296/203.02 |
| 5,275,436 | * | 1/1994 | Pomero ............................. 296/188 X |
| 5,549,349 | | 8/1996 | Corporon et al. ..................... 296/186 |
| 5,653,495 | * | 8/1997 | Bovellan et al. .................. 296/198 X |
| 5,882,065 | * | 3/1999 | Koiwa et al. .................... 296/203.02 |
| 6,007,144 | * | 12/1999 | Uloth .................................... 296/198 |

\* cited by examiner

Primary Examiner—Joseph D. Pape
(74) Attorney, Agent, or Firm—Roland A. Fuller, II

(57) ABSTRACT

In a motor vehicle having a front door opening with a front edge and a bottom edge, a structural assembly includes a first structural member, a second structural member, and an extension assembly. The first structural member extends along the bottom edge of the door opening. The second structural member extends along the front edge of the door opening. The second structural member upwardly extends from the first structural member. The extension assembly operates to transfer forces from the first structural member to the second structural member. The extension assembly includes a main body secured to the first structural member and a portion extending through an aperture in the first structural member and abutting the second structural member.

20 Claims, 6 Drawing Sheets

APPARATUS FOR TRANSFERRING IMPACT ENERGY FROM A TIRE AND WHEEL ASSEMBLY OF A MOTOR VEHICLE TO A SILL

BACKGROUND OF THE INVENTION

1. Field of the Invention

The present invention generally relates to motor vehicles. More particularly, the present invention relates to an apparatus for transferring impact energy from a tire and wheel assembly of motor vehicle to a sill.

2. Discussion

Many techniques have been employed in the field of motor vehicles to manage impact energy generated during a collision. The desire to transfer such energy to structural components of the motor vehicle is well known in the pertinent art. For example, commonly assigned U.S. Pat. No. 5,549,349 discloses a side impact protection system for a motor vehicle. The vehicle includes laterally spaced apart sills extending longitudinally along the vehicle. The side impact protection system includes a continuous, linearly extending cross member disposed laterally in the vehicle for transferring load and redistributing impact energy away from an impact side of the vehicle. The linearly extending cross member extends between, and is in abutment with, the laterally spaced apart sills and corresponding sill ceiling flanges. The linearly extending cross member transfers load and redistributes impact energy upon side impact of the vehicle.

A need remains in the art for more efficiently transferring energy generated during a front impact or an offset frontal impact from a front tire and wheel assembly to the vehicle frame.

SUMMARY OF THE INVENTION

It is a general object of the present invention to provide an apparatus for transferring impact energy from a front tire and wheel assembly of a motor vehicle to a sill.

In one form, the present invention provides a structural assembly for a motor vehicle. The motor vehicle has a front door opening with a front edge and a bottom edge. The structural assembly includes a first structural member, a second structural member, and an extension assembly. The first structural member extends along the bottom edge of the door opening. The second structural member extends along the front edge of the door opening. The second structural member upwardly extends from the first structural member. The extension assembly operates to transfer impact forces from the first structural member to the second structural member. The extension assembly includes a main body secured to the first structural member and a portion extending through an aperture in the first structural member and abutting the second structural member.

The present invention provides an apparatus for transferring energy created by an impact along the axis of a vehicle down the sill of the vehicle. The extension assembly provides a durable, non-deformable member that specifically transfers the impact energy of a front tire and wheel assembly which contacts the back of a wheel well during a collision. The extension assembly is designed and fashioned in a manner so as to direct the energy to the sill of the motor vehicle.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
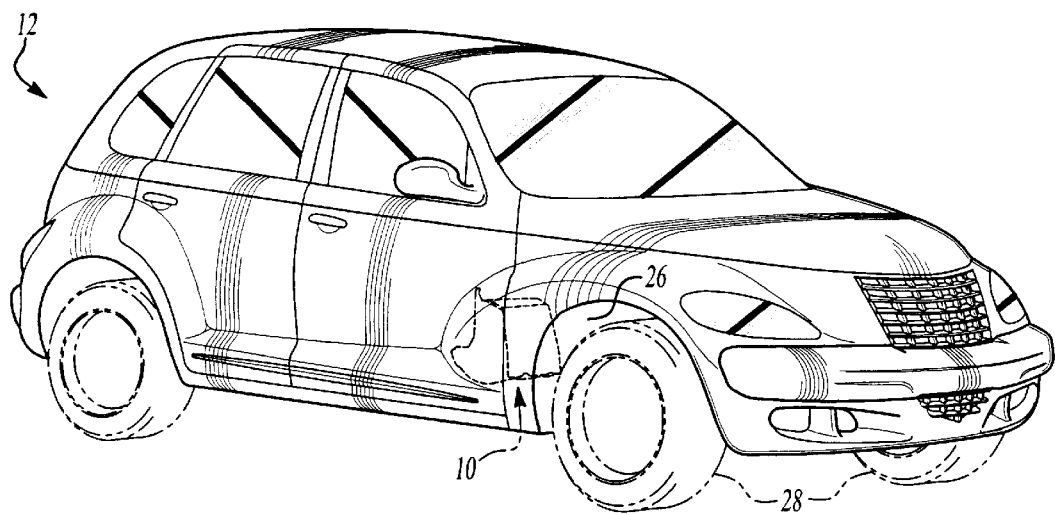
FIG. 1 is a perspective view of an exemplary motor vehicle incorporating an apparatus for transferring impact energy from a front tire and wheel assembly of a motor vehicle to a sill of the motor vehicle constructed in accordance with the teachings of a preferred embodiment of the present invention.
Figure 2:
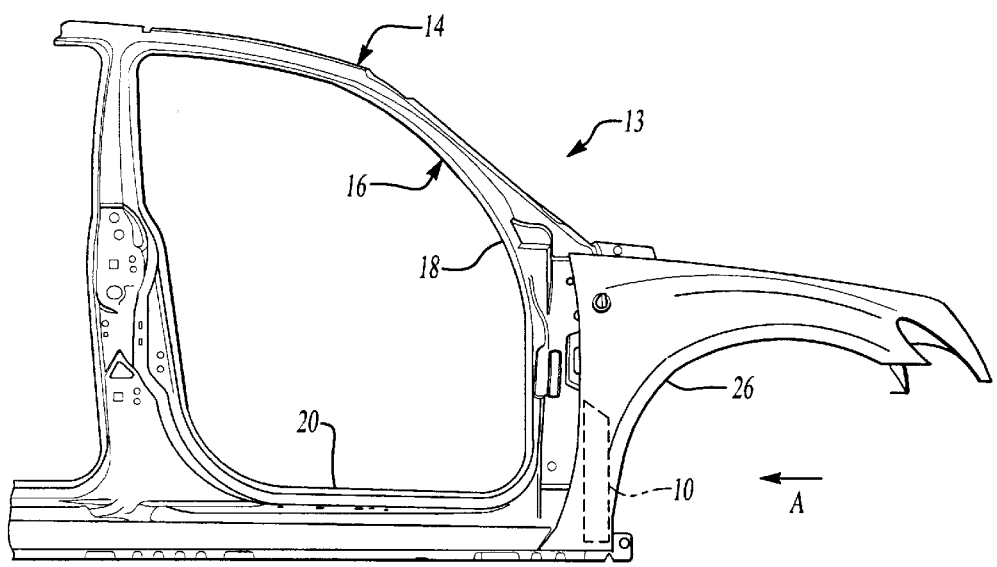
FIG. 2 is side view of a frame and a fender of the exemplary motor vehicle of FIG. 1.
Figure 3:
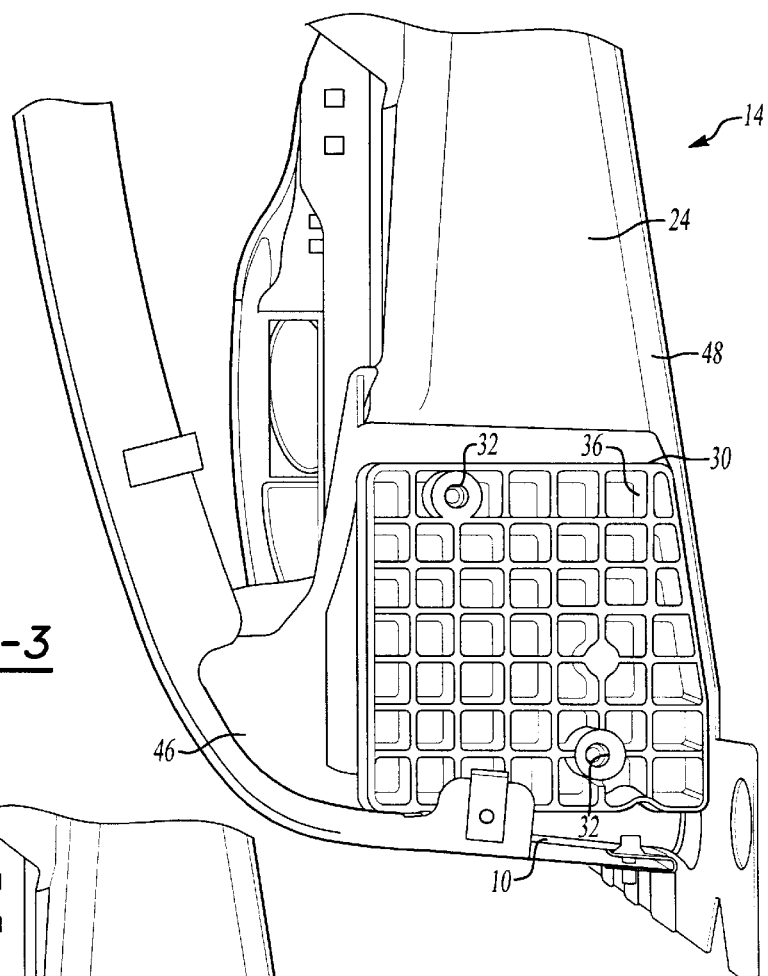
FIG. 3 is a view taken in the direction of Arrow A of FIG. 2.
Figure 4:
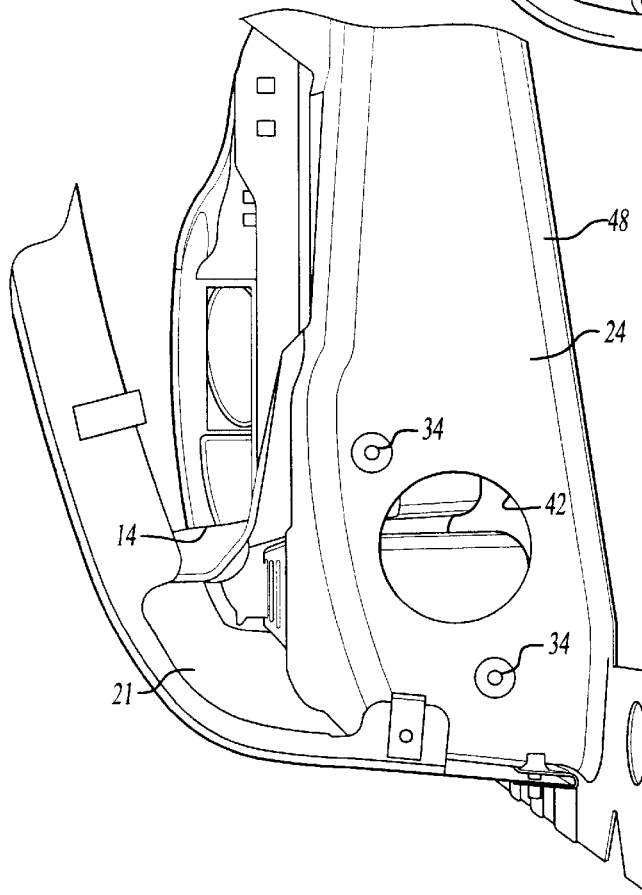
FIG. 4 is a view similar to FIG. 3 with the apparatus of the present invention removed for purposes of illustration.
Figure 5:
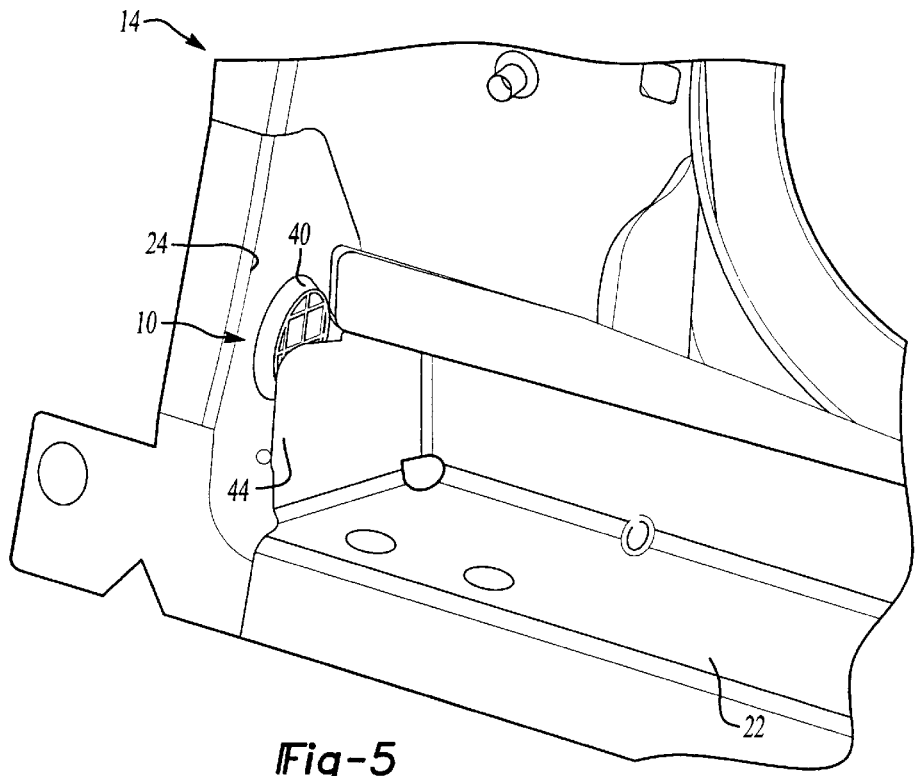
FIG. 5 is an enlarged perspective view of the apparatus of the present invention operatively illustrated with the frame of the exemplary motor vehicle.
Figure 6:
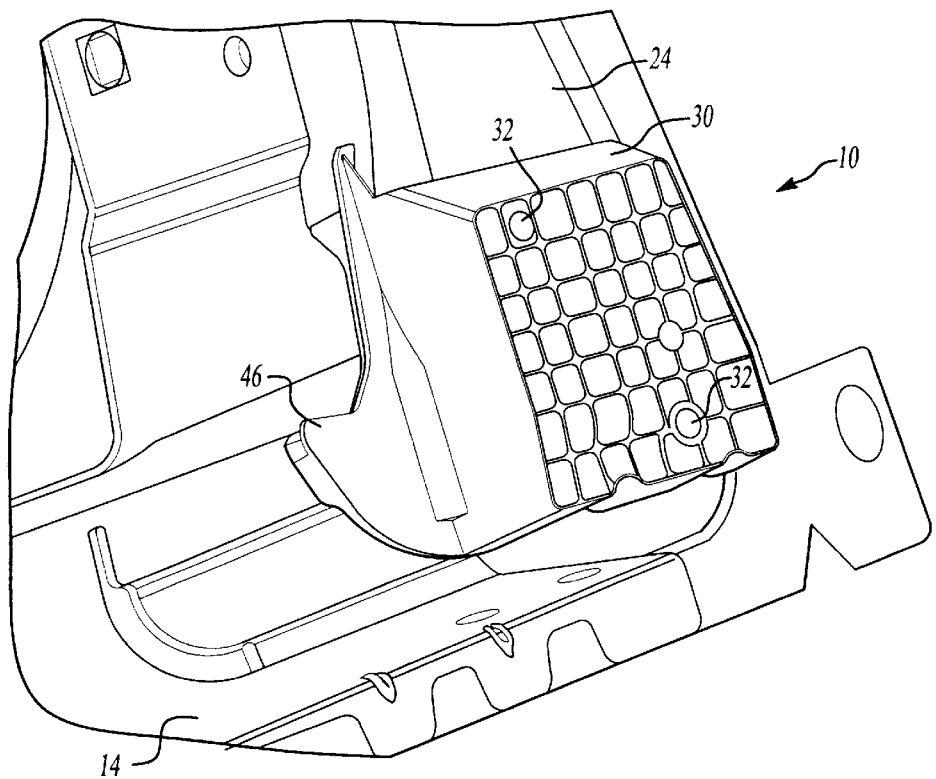
FIG. 6 is another enlarged perspective view of the apparatus of the present invention operatively associated with the frame of the motor vehicle.
Figure 7A:
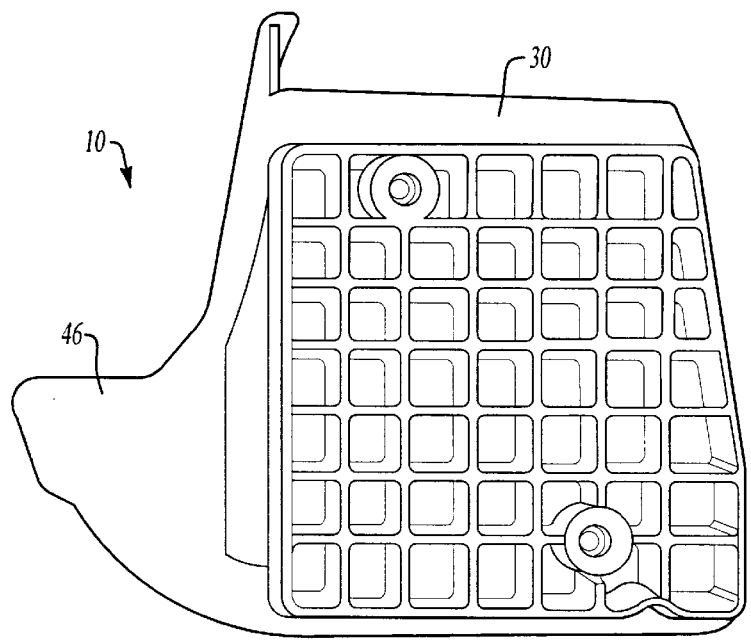
FIGS. 7a–7e are various views of the apparatus of the present invention removed from the exemplary use environment for purposes of illustration.
Figure 7B:
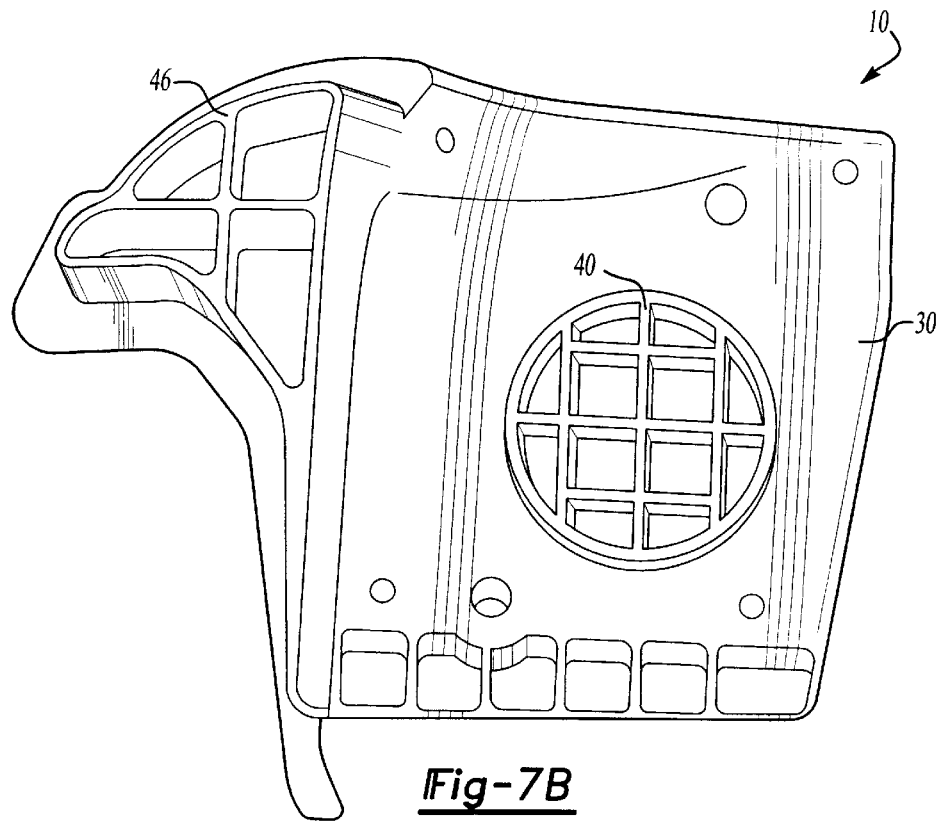
Figure 7C:
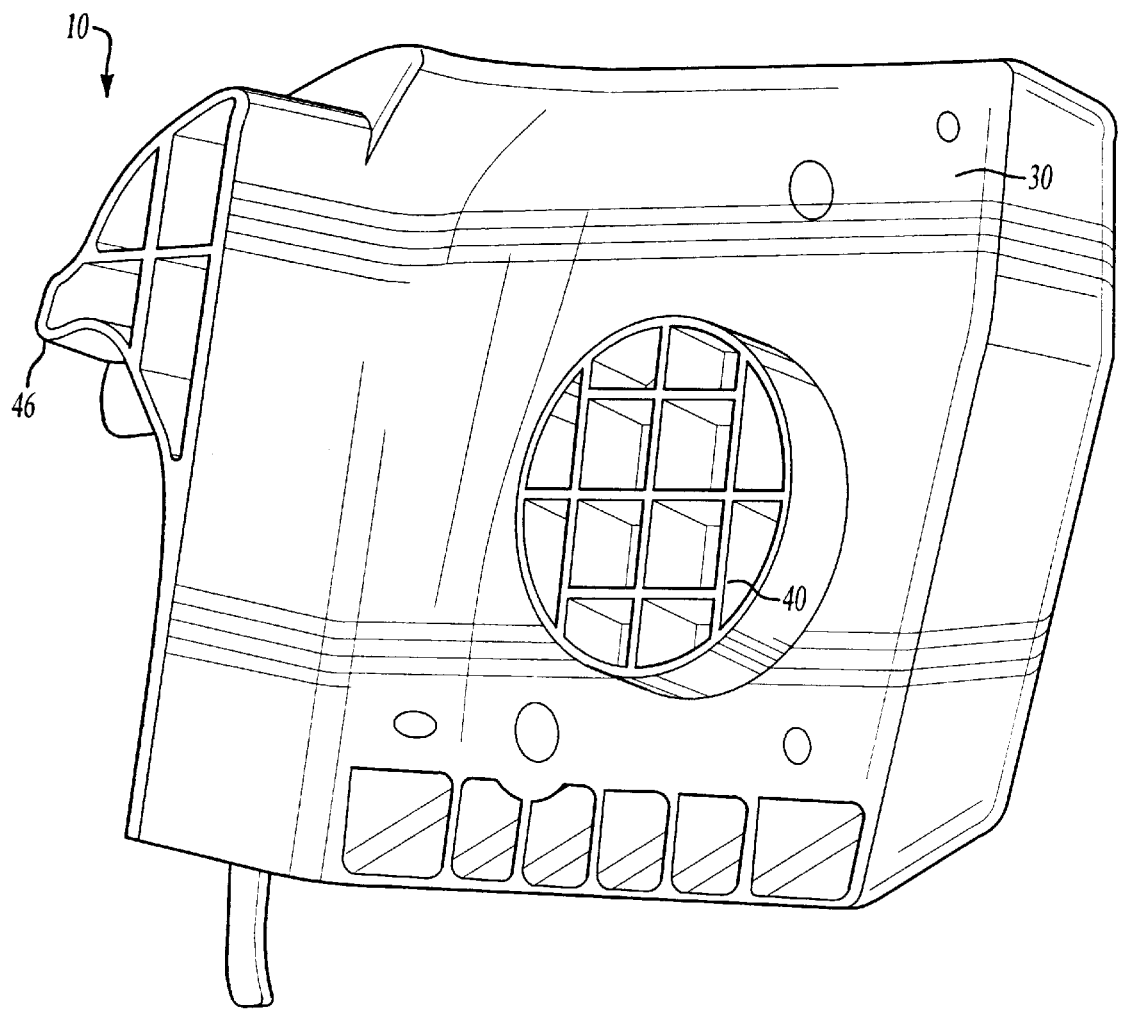
Figure 7D:
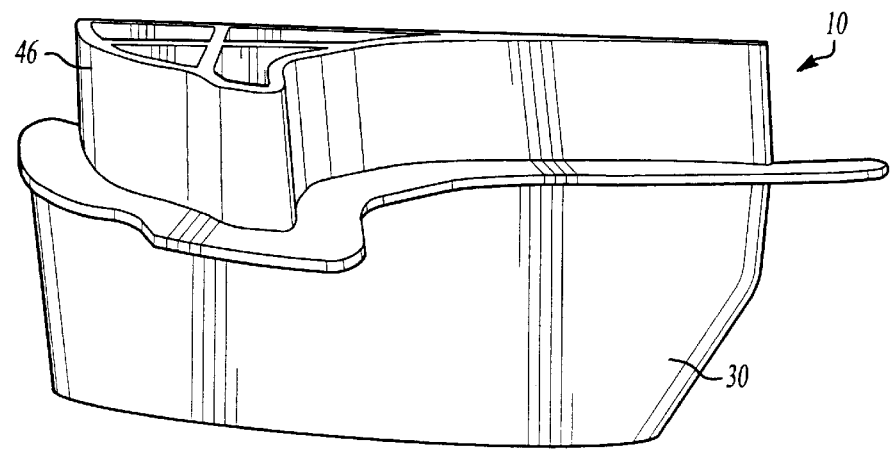
Figure 7E:
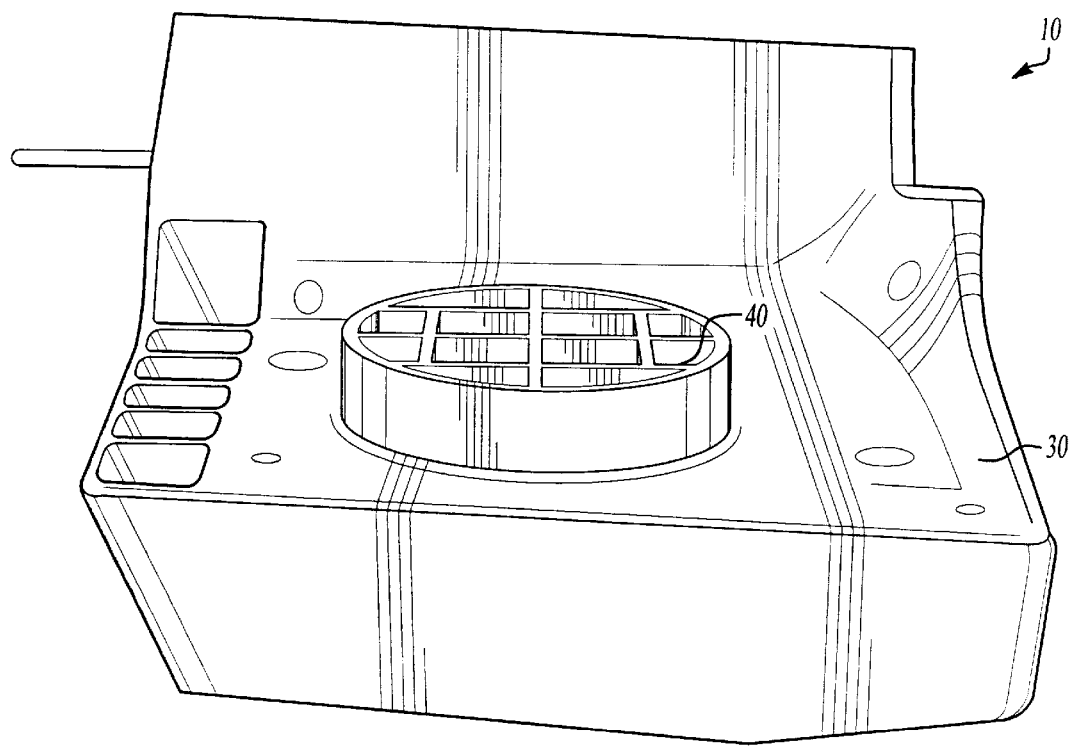

With general reference to the drawings, an apparatus for transferring impact energy from a front tire and wheel assembly of a motor vehicle to a sill constructed in accordance with the teachings of a preferred embodiment of the present invention is illustrated and generally identified at reference numeral 10. The apparatus 10 is shown operatively associated with an exemplary motor vehicle 12. It will be understood that the teachings of the present invention are not limited to any particular motor vehicle.

Prior to addressing the specific construction and function of the apparatus 10, a brief understanding of the exemplary use environment illustrated in the drawings is warranted. Insofar as the present invention is concerned, the remainder of the motor vehicle 12 is conventional in construction. For explanatory purposes, the motor vehicle 12 is illustrated to include a frame 13. The frame 13 has a pair of body side apertures or panels 14. The right side body side panel 14 is shown in detail throughout the drawings. The left side body side panel (not shown) will be understood to be a mirror image thereof. Each body side panel 14 is illustrated to define a front door opening 16. The front door opening 16 has a front edge 18 and a bottom edge 20. The particular configuration of the body side panel 14 of the exemplary motor vehicle defines a longitudinally extending opening 21 adjacent a lower edge thereof.

Associated with each of the body side panels 14, the frame 13 further includes a first structural member or sill 22 and a second structural member or front hinge pillar 24. The sill 22 is welded or otherwise suitably secured to the body side panel 14 in a conventional manner. The front hinge pillar 24 upwardly extends from the sill 22 and is welded or otherwise securely attached to the sill 22 and the body side panel 14. The body side panel 14 and the hinge pillar 24 cooperate to define a front wheel well 26.

The motor vehicle 12 is further illustrated to conventionally include a pair of front tire and wheel assemblies 28. The front tire and wheel assemblies 28 are disposed in associated wheel wells 26. As shown in FIG. 1, the right side front tire and wheel assembly 28 is positioned forward of the illustrated apparatus 10 of the present invention. The body side panel 14, sill 22 and front hinge pillar 24 insofar as they have been described, will be understood to be conventional in construction. As will become more apparent below, these components cooperate with the apparatus 10 of the present invention to provide a structural assembly for the motor vehicle 12.

The apparatus 10 of the present invention is preferably illustrated as a unitarily formed extension assembly. The apparatus 10 is shown to include a main body portion 30 secured to a rear face of the front hinge pillar 24. In the embodiment illustrated, the main body portion, which is generally rectangular in configuration, defines a pair of mounting apertures 32. The mounting apertures 32 align with holes 34 provided in the front hinge pillar 24 and are adapted to receive fasteners (not shown) for attachment to the front hinge pillar 24.

In the preferred embodiment, the main body 30 of the apparatus 10 is shown to include a honeycomb type configuration having a plurality of openings 36 aligned in rows and columns. The honeycomb type configuration provides manufacturing advantages while retaining the necessary strength requirements. However, it will be understood by those skilled in the art that the main body 30 may alternatively be solid in form.

The apparatus 10 of the present invention is illustrated to further include a first portion 40 which rearwardly extends therefrom. In the exemplary embodiment illustrated, the first portion 40 is generally cylindrical in shape and adapted to be matingly received within a circular opening 42 provided in the front hinge pillar 42. In this manner, the first portion 40 rearwardly extends to abut an upwardly extending flange 44 of the associated sill 22. As such, a path for the immediate transfer of impact energy is provided from the main body 30, which is positioned within the wheel well 26, to the sill 22.

The apparatus 10 of the present invention is illustrated to further include a second portion 46 which laterally extends from the main body 30. The second portion 46 is configured to be matingly received within the longitudinally extending opening or channel 21 defined by the body side panel 14. In this manner, the apparatus 10 not only functions to transfer impact forces in the manner described herein, but also seals the body side panel 14 which is otherwise open adjacent the wheel well 26.

As shown in the drawings, the frame 13 of the exemplary motor vehicle 12 includes a forwardly extending flange 48 conventionally used to join an outer body to an inner body. The flange 48 forwardly extends from the hinge pillar 24 into the wheel well 26. The apparatus 10 forwardly extends from the hinge pillar 24 a substantially identical distance. In this manner, the apparatus 10 distributes the load otherwise concentrated at the flange 48 during a collision.

In the preferred embodiment, the apparatus 10 is unitarily constructed of a non-compressible material. In one application, the apparatus 10 is unitarily constructed of nylon. However, it will be understood that other suitable materials may be incorporated.

Further, in the preferred embodiment, the nylon is co-molded with a structural foam (not shown) that is used to bond to the mating sheet metal components under the high heat seen during an elpo process of the entire body of the motor vehicle 12. By incorporating the structural foam, the lower portion of the vehicle 12 is sealed from natural elements.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A structural assembly for a motor vehicle having a front door opening with a front edge and a bottom edge, the structural assembly comprising:
    a first structural member extending along the bottom edge of the door opening;
    a second structural member extending along the front edge of the door opening, the second structural member upwardly extending from the first structural member; and
    an extension assembly for transferring forces from the second structural member to the first structural member, the extension assembly including a main body secured to the second structural member and a first portion extending through an aperture in the second structural member and disposed adjacent the first structural member.

2. The structural assembly for a motor vehicle of claim 1, wherein the extension assembly is unitarily constructed.

3. The structural assembly for a motor vehicle of claim 2, wherein the extension assembly is constructed of a non-compressible material.

4. The structural assembly for a motor vehicle of claim 3, wherein the extension assembly is constructed of nylon.

5. The structural assembly for a motor vehicle of claim 1, wherein the first structural member is a longitudinally extending sill.

6. The structural assembly for a motor vehicle of claim 5, wherein the second structural member is a front hinge pillar.

7. The structural assembly for a motor vehicle of claim 1, further comprising a body side panel defining a longitudinally extending opening, the extension assembly including a second portion matingly received within the opening.

8. The structural assembly for a motor vehicle of claim 1, wherein the first portion directly abuts the first structural member.

9. A structural assembly for a motor vehicle, the structural assembly comprising:
    a body side panel defining at least one door opening;
    a longitudinally extending sill secured to a lower edge of the body side panel;
    a front hinge pillar secured to the body side panel and upwardly extending relative to the sill; and
    an extension assembly for transferring impact forces from the front hinge pillar to the sill, the extension assembly including a main body secured to the front hinge pillar and a first portion extending through an aperture in the front hinge pillar and disposed adjacent a forward end of the sill.

10. The structural assembly for a motor vehicle of claim 9, wherein the extension assembly is unitarily constructed.

11. The structural assembly for a motor vehicle of claim 9 wherein the extension assembly is constructed of a non-compressible material.

12. The structural assembly for a motor vehicle of claim 10, wherein the extension assembly is constructed of nylon.

13. The structural assembly for a motor vehicle of claim 9, wherein the first portion directly abuts the sill.

14. The structural assembly for a motor vehicle of claim 9, wherein the body side panel defines a longitudinally extending opening, the extension assembly including a second portion matingly received within the opening.

15. A motor vehicle comprising:
a body side panel defining at least one door opening;
a longitudinally extending sill secured to a lower edge of the body side panel;
a front hinge pillar secured to the body side panel and upwardly extending relative to the sill; and
an extension assembly for transferring impact forces from the front hinge pillar to the sill, the extension assembly including a main body secured to the front hinge pillar and a first portion extending through an aperture in the front hinge pillar and disposed adjacent a forward end of the sill.

16. The motor vehicle of claim 15, wherein the extension assembly is unitarily constructed.

17. The motor vehicle of claim 15, wherein the extension assembly is constructed of a non-compressible material.

18. The motor vehicle of claim 17, wherein the extension assembly is constructed of nylon.

19. The motor vehicle of claim 15, wherein the first portion directly abuts the sill.

20. The motor vehicle of claim 15, wherein the body side panel defines a longitudinally extending opening, the extension assembly including a second portion matingly received within the opening.

* * * * *